United States Patent [19]

Herrmann et al.

[11] Patent Number: 6,025,033
[45] Date of Patent: Feb. 15, 2000

[54] METHOD OF PRODUCING MULTI-LAYER COATINGS

[75] Inventors: Friedrich Herrmann, Wuppertal; Herbert Kälke, Mülheim-Ruhr, both of Germany

[73] Assignee: Herberts GmbH, Wuppertal, Germany

[21] Appl. No.: 09/186,327

[22] Filed: Nov. 5, 1998

[30] Foreign Application Priority Data

Nov. 5, 1997 [DE] Germany ............ 197 48 792

[51] Int. Cl.⁷ ................ B05D 1/36; B05D 7/16
[52] U.S. Cl. ............ 427/407.1; 427/142; 427/409
[58] Field of Search .............. 427/409, 407.1, 427/385.5, 388.2, 140, 142

[56] References Cited

U.S. PATENT DOCUMENTS

| | | | |
|---|---|---|---|
| 4,830,909 | 5/1989 | Cohen et al. | 428/331 |
| 4,956,240 | 9/1990 | Williams | 428/423.7 |
| 5,166,272 | 11/1992 | Burks et al. | 525/285 |
| 5,294,665 | 3/1994 | Pedain et al. | 524/591 |
| 5,342,882 | 8/1994 | Gobel et al. | 427/385.5 |
| 5,418,264 | 5/1995 | Obloh et al. | 523/414 |
| 5,496,642 | 3/1996 | Martinez | 428/423.1 |
| 5,910,369 | 6/1999 | Macris et al. | 428/423.1 |

FOREIGN PATENT DOCUMENTS

| | | |
|---|---|---|
| 0 172 337 A1 | 2/1986 | European Pat. Off. . |
| 38 03 628 A1 | 8/1989 | Germany . |
| 44 00 854 C2 | 7/1995 | Germany . |
| 195 19 035 A1 | 11/1996 | Germany . |

*Primary Examiner*—Diana Dudash
*Attorney, Agent, or Firm*—Pillsbury Madison & Sutro LLP

[57] ABSTRACT

A method of producing a multi-layer coating comprising the application of a color- and/or effect-imparting base lacquer coat of an aqueous base lacquer, the wet-into-wet-application on to the aqueous base lacquer coat of a clear lacquer coat of a two-component polyurethane clear lacquer, which is produced shortly before the application thereof by mixing a master lacquer component, which contains hydroxy-functional binder vehicles and solvents, with a polyisocyanate component, and joint stoving of the aqueous base lacquer and clear lacquer coats, wherein the two-component polyurethane clear lacquer which is used contains 0.01 to 1% by weight, with respect to the clear lacquer solids, of one or more additives with a surface tension-lowering effect, wherein at least 25% by weight of the additives with a surface tension-lowering effect is contained in the polyisocyanate hardener component before mixing.

2 Claims, No Drawings

METHOD OF PRODUCING MULTI-LAYER COATINGS

This invention relates to a method of producing a multi-layer coating of an aqueous base lacquer and a two-component polyurethane clear lacquer, hereinafter abbreviated to "2-C PU clear lacquer".

The production of multi-layer coatings of the base lacquer/clear lacquer type by wet-into-wet application of an aqueous base lacquer and of a 2-C PU clear lacquer is a coating method which is widely used in the field of coating automobiles and automobile parts. 2-C PU clear lacquers are first produced shortly before the application thereof by mixing a master lacquer component, which contains a hydroxy-functional binder vehicle, with a polyisocyanate hardener component. Whereas manual mixing is effected using customary stirrers, mixer units for two-component lacquers, such as static mixers (for example the Kenics mixer), are available in industrial coating installations, for example in installations for the mass-production coating of automobiles.

Clear lacquers often exhibit wetting problems, as well as a susceptibility to crater formation when aqueous base lacquer coats are overcoated. Crater formation in particular often does not become apparent until after the clear lacquer coat has been stoved. This results in an unwanted proportion of returns, i.e. necessitates re-working or repair coating operations which impair the progress of the mass-production coating process and add to the cost thereof.

The object of the present invention is to avoid the aforementioned disadvantages and to achieve a higher degree of process reliability during the production of multi-layer coatings from an aqueous base lacquer and 2-C PU clear lacquer which are applied by the wet-into-wet method. The object in particular is to reduce the proportion of returns for finish-coated substrates, i.e. substrates which have been provided with a stoved base lacquer/clear lacquer two-component coating, particularly automobile bodies and parts thereof.

It has been found that this object can be achieved if the polyisocyanate hardener component which is used by mixing it with the master lacquer component during the production of 2-C PU clear lacquers contains at least 25% by weight of the total amount of the additives with a surface tension-lowering effect which are contained in the finish-mixed 2-C PU clear lacquer. Within the scope of the present invention, it has been found that it is very important to incorporate at least part of the additives with a surface tension-lowering effect which are contained in the finish-mixed 2-C PU clear lacquer as constituents of the polyisocyanate hardener component, and not to incorporate these in the 2-C PU clear lacquer solely as constituents of the master lacquer. A surprisingly positive effect is achieved in the sense of the aforementioned object if at least 25% by weight, with respect to the total content thereof, of the additives with a surface tension-lowering effect which are contained in the finish-mixed 2-C PU clear lacquer enter the 2-C PU clear lacquer via the polyisocyanate hardener component, i.e. as constituents thereof.

The present invention therefore relates to a method of producing a multi-layer coating, comprising the application of a colour- and/or effect-imparting base lacquer coat of an aqueous base lacquer, the wet-into-wet-application on to the aqueous base lacquer coat of a clear lacquer coat of a two-component polyurethane clear lacquer, which is produced shortly before the application thereof by mixing a master lacquer component, which contains hydroxy-functional binder vehicles and solvents, with a polyisocyanate component, and joint stoving of the aqueous base lacquer and clear lacquer coats, which is characterised in that the two-component polyurethane clear lacquer which is used contains 0.01 to 1% by weight, with respect to the clear lacquer solids, of one or more additives with a surface tension-lowering effect, wherein at least 25% by weight of the total amount of additives with a surface tension-lowering effect is contained in the polyisocyanate hardener component before mixing.

The clear lacquer solids content is formed by the non-volatile constituents.

The aqueous base lacquers which are used in the method according to the invention are the usual colour- and/or effect-imparting aqueous base lacquer coating media which are familiar to one skilled in the art, such as those which are used for the production of base lacquer/clear lacquer two-layer coatings, a large number of which is known from the patent literature for example. They are subject to no limitations. The aqueous base lacquers contain binder vehicle systems which are stabilised anionically, cationically or non-ionically, for example. The aqueous base lacquers may be physically drying or may be crosslinkable by the formation of covalent bonds. Aqueous base lacquers which crosslink by the formation of covalent bonds may be self-crosslinking or externally crosslinkable systems. If the binder vehicles are not self-crosslinking or physically dying, the aqueous base lacquers may also contain crosslinking agents. Neither the binder vehicle component nor the crosslinking agent component is subject to any limitations. For example, customary film-forming polyester, polyurethane and/or (meth)acrylic copolymer resins can be used as film-forming binder vehicles. Mixtures of different binder vehicles can also be used. The systems preferably contain polyurethane resins, most preferably in a proportion of at least 15% by weight with respect to the solid resin content of the aqueous base lacquer. The choice of the crosslinking agents which are optionally contained is not critical. It depends on the functionality of the binder vehicles, i.e. the crosslinking agents are selected so that they exhibit a reactive functionality which is complementary to the functionality of the binder vehicles. Examples of complementary functionalities such as these between binder vehicles and crosslinking agents include: hydroxyl/methylol ether, hydroxyl/free isocyanate, hydroxyl/blocked isocyanate, carboxyl/epoxide. Provided that they are compatible with each other, a plurality of complementary functionalities such as these may exist in parallel in an aqueous base lacquer. The crosslinking agents which are optionally contained in the aqueous base lacquers may be present individually or in admixture.

In addition to customary physically drying and/or chemically crosslinking binder vehicles, the aqueous base lacquers which are used in the method according to the invention contain inorganic and/or organic colouring pigments and/or effect pigments, such as titanium dioxide, iron oxide pigments, carbon black, azo pigments, phthalocyanine pigments, metal pigments, e.g. those comprising titanium, aluminium or copper, interference pigments such as titanium dioxide-coated aluminium, coated mica, graphite effect pigments, lamellar iron oxide and lamellar copper phthalocyanine pigments for example.

The aqueous base lacquers may also contain customary lacquer adjuvant substances, such as extenders, catalysts, flow enhancers or anti-crater agents, and in particular may contain light stabilisers, optionally in combination with antioxidants.

The 2-C PU clear lacquers which are used in the method according to the invention are the customary, known 2-C PU clear lacquer coating media, such as those which can be used for the production of base lacquer/clear lacquer two-layer coatings and which are known from a multiplicity of patent documents for example. They are subject to no limitations.

In addition to one or more hydroxy-functional binder vehicles, organic solvents and one or more polyisocyanate hardeners, as well as one or more additives which lower the surface tension, the 2-C PU clear lacquers which are used in the method according to the invention may contain one or more hydroxy-functional reactive thinners for example, as well as other additives which are customary for clear lacquers. The 2-C PU clear lacquers which are used in the method according to the invention are produced by mixing a master lacquer component, which contains hydroxy-functional binder vehicles and organic solvents, with a polyisocyanate hardener component which contains at least 25% by weight of the additives with a surface tension-lowering effect which are contained in the finish-mixed 2-C PU clear lacquer. The master lacquer component may contain polyester, polyurethane and/or (meth)acrylic copolymer resins, individually or in admixture, as film-forming hydroxy-functional binder vehicles for example.

Examples of hydroxy-functional polyester resins which are contained in the master lacquer component as binder vehicles include the customary resins of this type, for example those with a number average molecular weight (Mn) of 500 to 5000, preferably 1000 to 3000, and with hydroxyl numbers of 30 to 450, preferably 50 to 280 mg KOH/g.

Examples of hydroxy-functional polyurethane resins which are contained in the master lacquer component as binder vehicles include the customary resins of this type, for example those with a number average molecular weight (Mn) of 500 to 5000, preferably 1000 to 3000, and hydroxyl numbers of 30 to 450, preferably 50 to 280 mg KOH/g.

Examples of hydroxy-functional (meth)acrylic copolymers which are contained in the master lacquer component as binder vehicles include customary copolymers of this type, for example those with a number average molecular weight (Mn) between 1000 and 10,000 and hydroxyl numbers of 30 to 300, preferably 50 to 250 mg KOH/g. The (meth)acrylic copolymers may have been produced in the presence of oligomeric or polymeric polyester and/or polyurethane resins, for example those described in the two preceding paragraphs.

The master lacquer component contains one or more volatile organic solvents, such as glycol ethers, e.g. butyl glycol, butyl diglycol, dipropylene glycol dimethyl ether, dipropylene glycol monomethyl ether or ethylene glycol dimethyl ether; glycol ether esters such as ethyl glycol acetate, butyl glycol acetate, 3-methoxy-n-butyl acetate, butyl diglycol acetate or methoxypropyl acetate; esters such as butyl acetate, isobutyl acetate or amyl acetate; ketones such as methyl ethyl ketone, methyl isobutyl ketone, diisobutyl ketone, cyclohexanone or isophorone; alcohols such as methanol, ethanol, propanol or butanol; aromatic hydrocarbons such as xylene, Solvesso 100 (registered Trade Mark for a mixture of aromatic hydrocarbons with a boiling range of 155 to 185° C.), and aliphatic hydrocarbons.

The master lacquer component may contain one or more hydroxy-functional reactive thinners. Examples include low molecular weight compounds which comprise at least two hydroxyl groups per molecule and which have hydroxyl numbers within the range from 250 to 700 mg KOH/g, for example those with a molecular weight of 62 to 400; other substances which are suitable include oligomeric or polymeric polyols, such as polyether polyols, oligoester polyols, polycarbonate polyols and oligourethane polyols. Examples of suitable substances include commercial products such as polycaprolactone polyols which are obtainable by the reaction of polyols with caprolactone, polyether polyols which are obtainable by the reaction of oxirane compounds with polyols and/or water, such as triethylene glycol for example, or oligourethane polyols which are obtainable by the reaction of polyamines with cyclic carbonates.

Unless the total amount of the additives with a surface tension-lowering effect which are contained in the finish-mixed 2-C PU clear lacquer in an amount of 0.01 to 1% by weight with respect to the clear lacquer solids is a constituent of the polyisocyanate hardener component, the master lacquer component may contain the corresponding complementary quantitative proportion of up to 75% by weight of said additives.

The master lacquer component may also contain other additives which are customary for clear lacquers in amounts which are customary for lacquers, e.g. transparent, colourless pigments or extenders, light stabilisers, antioxidants, rheology-controlling agents such as di- or polyurea compounds, microgels, NADs (=non-aqueous dispersions), or substances which supply formaldehyde at the latest when the clear lacquer produced from the 2-C PU clear lacquer is stoved. If coloration is desired, the master lacquer component may also contain colorants, absorption pigments which have been ground so that they are transparent, and/or quantitative proportions of absorption pigments which are non-hiding. The polyisocyanate hardener component contains one or more free polyisocyanates as hardeners for the hydroxy-functional binder vehicles.

Examples of polyisocyanates which are contained in the polyisocyanate hardener component include cycloaliphatic or aliphatic diisocyanates such as tetramethylene diisocyanate, 1,6-hexamethylene diisocyanate, 1,12-dodecane diisocyanate, cyclohexane 1,3- and 1,4-diisocyanate, isophorone diisocyanate, biscyclohexyl-methane diisocyanate or mixtures thereof.

Apart from these simple isocyanates, those which contain hetero atoms in the radical linking the isocyanate groups are also suitable. Examples thereof include polyisocyanates which comprise carbodiimide groups, allophanate groups, isocyanurate groups, uretdione groups, urethane groups, acylated urea groups and biuret groups.

Polyisocyanates which are particularly suitable are those which are mainly used for the production of lacquers, e.g. modification products, which contain biuret, isocyanurate or urethane groups, of the aforementioned simple polyisocyanates, particularly tris-(6-isocyanatohexyl)-biuret, the isocyanurate which is derived from isophorone diisocyanate or hexane diisocyanate, or polyisocyanates which comprise low molecular weight urethane groups, such as those which can be obtained by the reaction of isophorone diisocyanate, which is used in excess, with simple polyhydric alcohols of molecular weight range 62 to 300, particularly with trimethylolpropane. Any mixtures of said polyisocyanates may also of course be used.

Other suitable polyisocyanates include the known prepolymers which comprise terminal isocyanate groups, such as those which can be obtained in particular by the reaction of the aforementioned simple polyisocyanates, primarily diisocyanates, with sub-stoichiometric amounts of organic compounds comprising at least two groups which are reactive towards isocyanate groups.

It is essential to the invention that the polyisocyanate hardener component contains, in addition to one or more polyisocyanate hardeners, at least 25, preferably at least 50% by weight, and most preferably the total amount of additives with a surface tension-lowering effect which are contained in the finish-mixed 2-C PU clear lacquer. The total amount of additives with a surface tension-lowering effect which is contained in the finish-mixed 2-C PU clear lacquer is 0.01 to 1% by weight with respect to the clear lacquer solids. The additives with a surface tension-lowering effect which are contained in the 2-C PU clear lacquers used in the method according to the invention comprise a pure active ingredient or mixtures of pure active ingredients, or comprise preparations which contain the active ingredient or active ingredients, for example organic solutions of the active ingredient or active ingredients. Data given in % by weight also relate to the content of pure active ingredients in the case of preparations. The additives with a surface tension-lowering effect, namely the active ingredients, are substances which exhibit a surface tension-lowering effect when used in the aforementioned amount in the 2-C PU clear lacquers which are used in the method according to the invention. In particular, they are substances which result in a considerable lowering of the surface tension of the polyisocyanate hardener component when used as a constituent of the polyisocyanate hardener component. Particular examples of active ingredients include customary lacquer flow additives or anti-crater agents, a multiplicity of which is offered for sale by suppliers to the lacquer industry. The preferred examples of additives which lower the surface tension are additives which contain fluorine, or especially those which are based on organopolysiloxanes or silicones or which are based on acrylates.

The polyisocyanate hardener component generally contains volatile organic solvents which are inert to isocyanate groups (which contain no active hydrogen). Examples of solvents such as these include glycol ethers which are free from hydroxyl groups, such as dipropylene glycol dimethyl ether or ethylene glycol dimethyl ether; glycol ether esters such as ethyl glycol acetate, butyl glycol acetate, 3-methoxy-n-butyl acetate, butyl diglycol acetate or methoxypropyl acetate; esters such as butyl acetate, isobutyl acetate or amyl acetate; ketones such as methyl ethyl ketone, methyl isobutyl ketone, diisobutyl ketone, cyclohexanone or isophorone; aromatic hydrocarbons such as xylene, Solvesso 100 (registered Trade Mark for a mixture of aromatic hydrocarbons with a boiling range of 155 to 185° C.), and aliphatic hydrocarbons.

In addition to the additives with a surface tension-lowering effect which are contained in the finish-mixed 2-C PU clear lacquer, the polyisocyanate hardener component may contain other additives which are customary for clear lacquers, in the usual amounts, provided that these are additives which are inert to isocyanate groups. Examples of additives such as these include transparent, colourless pigments or extenders, light stabilisers, antioxidants, rheology-controlling agents such as di- or polyurea compounds, microgels, NADs (=non-aqueous dispersions), substances which supply formaldehyde at the latest when the clear lacquer produced from the 2-C PU clear lacquer is stoved, or drying agents (for removing traces of water). The polyisocyanate component preferably contains no further additives apart from the additives with a surface tension-lowering effect which are contained in the finish-mixed 2-C PU clear lacquer.

The 2-C PU clear lacquers which are used in the method according to the invention are produced from the master lacquer and polyisocyanate hardener components in a stoichiometric ratio which is matched to the sought-after degree of crosslinking and which is generally 50 to 90 parts by weight of binder vehicles and optionally of reactive thinners to 50 to 10 parts by weight of crosslinking agents. Mixing of the master lacquer and polyisocyanate hardener components can be effected using customary stirrers or using mixer units for two-component lacquers which are customary in industrial coating installations, for example in installations for the original lacquer-coating of automobiles, e.g. static mixers (for example Kenics mixers). It is not necessary to employ mixing technology which ensures a higher intensity of mixing, such as dynamic mixers for example. This is a further advantage of the method according to the invention.

In the state in which they are suitable for application, the 2-C PU clear lacquers which are used in the method according to the invention preferably have a solids content of 40 to 80% by weight. This can be adjusted during the mixing of the master lacquer and polyisocyanate hardener components or can be adjusted to the desired value by adding organic solvents after mixing the two components.

The 2-C PU clear lacquers are used in the method according to the invention for the production of the outer clear lacquer coat of a base lacquer/clear lacquer two-layer coating.

The base lacquer/clear lacquer two-layer coating is produced by the application and stoving of a clear lacquer coating layer of the 2-C PU clear lacquer on to a substrate which is provided with a colour- and/or effect-imparting aqueous base lacquer coat. The colour- and/or effect-imparting aqueous base lacquer coat is optionally applied to a pre-coated substrate, particularly to pre-coated automobile bodies or parts thereof. Examples of preliminary coatings on automobile bodies or parts thereof include an electro-dip primer coat, a two-layer preliminary coating consisting of an electro-dip primer coat and a sprayed primer surfacer coat, or a two-layer preliminary coating consisting of an electro-dip primer coat and a second coating layer applied by electro-dip coating.

The 2-C PU clear lacquer is applied by the known wet-into-wet-method to the aqueous base lacquer coat which determines the colour shade of the multi-layer coating. The base lacquer coat is applied by spraying, using a colour- and/or effect-imparting aqueous base lacquer to give a dry coat thickness which depends on the colour shade but which is between 10 and 40 $\mu$m for example. The application of the aqueous base lacquer coat is followed, after a brief ventilation/volatilisation phase, e.g. at 20 to 80° C., by the application of the clear lacquer coat comprising the 2-C PU clear lacquer, by spraying to give a dry coat thickness which is generally between 25 and 50 $\mu$m. A brief ventilation/volatilisation phase may optionally be included. It is often advantageous and preferable to assist the ventilation/volatilisation step by heating, preferably with the aid of infrared irradiation for example. Thereafter, the substrate is subjected to a stoving process in which the clear lacquer coating layer is stoved together with the base lacquer coat at elevated temperatures, of 80 to 160° C. for example.

The method according to the invention results in a high degree of process reliability during the production of multi-layer coatings by the wet-into-wet-application of an aqueous base lacquer and a 2-C PU clear lacquer. The proportion of returns mentioned at the outset generally depends on a series of parameters, such as the choice of the actual coating process parameters in particular, on the type and colour shade of the aqueous base lacquer, and on the type of 2-C PU clear lacquer. Overall, the proportion of returns is reduced by the procedure according to the invention, as has been shown by comparison with a coating method which is carried out analogously but in which the additives with a surface tension-lowering effect which are contained in the 2-C PU clear lacquer are exclusively a constituent of the master lacquer component. A reduction of up to 60% in the proportion of returns was achieved in a series of statistical tests performed by the Applicant. For example, the proportion of returns could be reduced from 25% to 10%. The 2-C PU clear lacquer which is used in the method according to the invention can be produced from the master lacquer and polyisocyanate hardener components using customary stirrers or using mixer units for two-component lacquers which are customary in industrial coating installations., e.g. static mixers (Kenics mixers for example). It is not necessary to employ mixing technology which ensures a higher intensity of mixing, such as dynamic mixers for example, in order to achieve the effect according to the invention of increasing the level of process reliability.

We claim:

1. A method of producing a multi-layer coating, comprising the application of a colour- and/or effect-imparting base lacquer coat of an aqueous base lacquer, the-wet-into-wet-application on to the aqueous base lacquer coat of a clear lacquer coat of a two-component polyurethane clear lacquer, which is produced shortly before the application thereof by mixing a master lacquer component, which contains hydroxy-functional binder vehicles and solvents, with a polyisocyanate component, and joint stoving of the aqueous base lacquer and clear lacquer coats, characterised in that the two-component polyurethane clear lacquer which is used contains 0.01 to 1% by weight, with respect to the clear lacquer solids, of one or more additives with a surface tension-lowering effect, wherein at least 25% by weight of the additives with a surface tension-lowering effect is contained in the polyisocyanate hardener component before mixing.

2. A method according to claim 1, characterised in that a two-component polyurethane clear lacquer is used, the polyisocyanate hardener component of which contains at least 50% by weight of additives with surface tension-lowering effect before mixing.

* * * * *